(No Model.)
J. W. TUCKER.
HARVESTER CANVAS BELT BUCKLER.
No. 357,644. Patented Feb. 15, 1887.
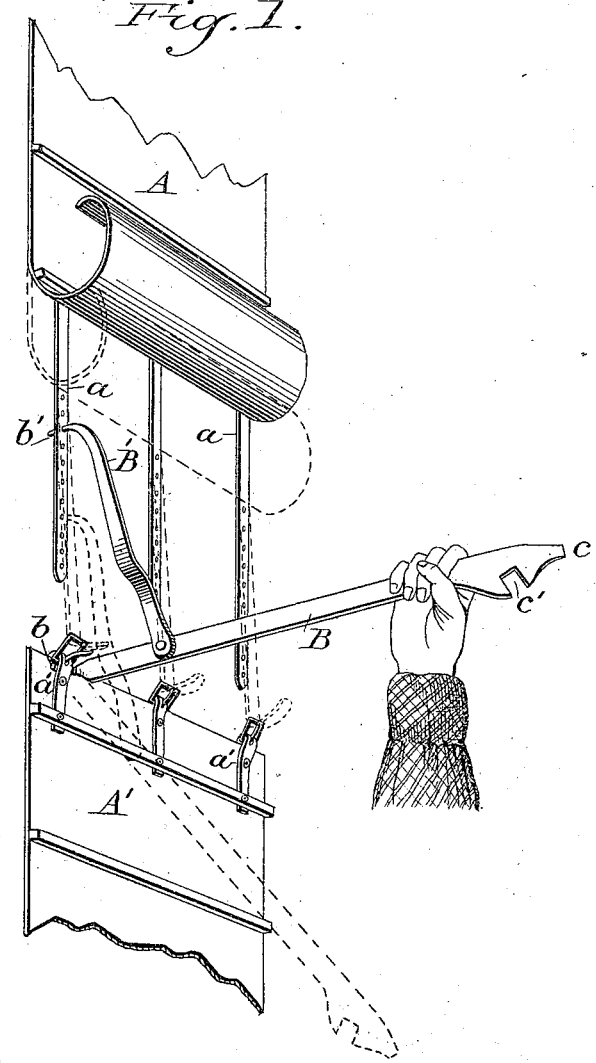
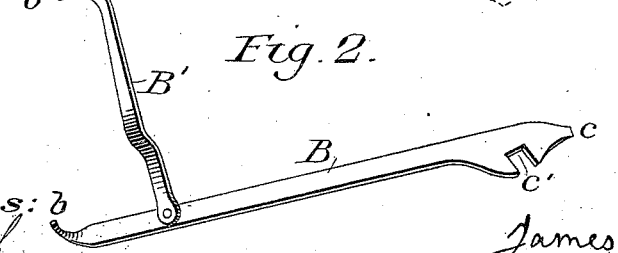
Witnesses:
C. E. Frith
P. J. Becker
Inventor:
James W. Tucker
By J. W. Forel, Atty.

UNITED STATES PATENT OFFICE.

JAMES W. TUCKER, OF BATAVIA, NEW YORK, ASSIGNOR TO THE JOHNSTON HARVESTER COMPANY, OF SAME PLACE.

HARVESTER CANVAS-BELT BUCKLER.

SPECIFICATION forming part of Letters Patent No. 357,644, dated February 15, 1887.

Application filed September 13, 1886. Serial No. 213,472. (No model.)

*To all whom it may concern:*

Be it known that I, JAMES W. TUCKER, a citizen of the United States, residing at Batavia, in the county of Genesee and State of New York, have invented a new and useful Harvester Canvas-Belt Buckler, of which the following is a specification.

In grain-binders having canvas belting for conveying the cut stalks of grain to the binding mechanism a difficulty is found in placing the canvas in working position on account of the liability of the canvas to shrink when exposed to dampness upon the removal of the same from the machine, which, for the better preservation of the canvas, is done when not in practical operation, and when so shrunken it is with great difficulty that the securing-straps are drawn through the buckles sufficiently far for the operator to obtain a secure hold upon the strap, so as to stretch the same enough to insure proper working; and to this end my invention relates to improvements in buckling implements in which a pivoted draw-hook is attached to a lever-bar having a hooked end for inserting within the loop carrying the buckle located upon one end of the belt, while the draw-hook, being also provided with a hooked end, is capable of being inserted into a buckle-hole in the strap upon the other end of the canvas, the object being to form a line by which the ends of the belting are united and made continuous, so that the belt may be revolved by the well-known roller which receives motion from the driving-wheel through suitable mechanism and in the usual manner.

In the drawings illustrative of my invention, Figure 1 is a perspective view of the buckler in operative position, and Fig. 2 is a perspective view of the implement detached from the belting.

Similar letters refer to similar parts in both views.

A represents the end of the canvas carrying the buckle-strap $a$, and A' the end to which is attached the buckle by means of the loop $a'$. The strap and loop (being made of leather) are riveted to the canvas in the usual manner.

B is the lever-bar having the small rounded upturned end $b$, and pivoted to the lever-bar is a draw-hook, B', having the hooked end $b'$, which is made of dimensions suitable for entering one of the holes in the strap $a$, made for the insertion of the buckle-tongue when the canvas is placed in its normal position upon the machine.

For convenience in using my buckler, in connection with self-binding harvesters having parts that need frequent adjustment, I have arranged the end of the lever-bar so as to form a screw-driving point, $c$; also, I have cut one or more notches, $c'$, in the bar for producing a wrench, whereby three implements are combined in one.

It will be observed that the draw-hook has a lateral bend or offset equal to one-half the width of the strap $a$, so that when the end of the strap is drawn in contiguity with the buckle the two (buckle and strap) are in the same laterally, thus allowing an easy uniting of the parts.

The buckling operation is as follows: After the canvas belt has been placed in proper position upon the revolving rollers the ends of the said canvas are brought in as close proximity as can be conveniently done by hand, when the upturned end of the lever-bar is inserted into the loop $a'$ just in rear of the buckle, after which the free end of the bar is thrown over toward the part A, so as to allow of the insertion of the curvated end of the draw-hook into a buckle-hole of the strap $a$, but at some little distance from the end thereof, after which the bar is swung back to the opposite position, the strap drawn forward, and by reason of the remote attachment before mentioned the end of the strap may be run through the buckle sufficiently far to be grasped by the hand of the operator.

If desired, the buckle-tongue can be placed in the proper securing-hole before removing the buckler, all of which will be readily understood without further description.

Having now described my invention, what I claim as new, and desire to secure by Letters Patent, is—

A combination-tool consisting of the draw-bar having a single reduced upturned end capable of being inserted in the buckle-loop and a draw-hook pivoted thereto near the hooked end thereof, the draw-hook having the curved end corresponding in dimensions
5 with the size of the buckle-hole of the strap, the draw-bar being provided at its opposite end with the screw-driver and nut-wrench, for the purposes herein described, and substantially as set forth.

JAMES W. TUCKER.

Witnesses:
G. W. FORD,
E. J. MOCKFORD.